United States Patent
Ashjaee

(10) Patent No.: US 10,613,231 B2
(45) Date of Patent: Apr. 7, 2020

(54) PORTABLE GNSS SURVEY SYSTEM

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 197 days.

(21) Appl. No.: 14/975,173

(22) Filed: Dec. 18, 2015

(65) Prior Publication Data

US 2016/0178368 A1 Jun. 23, 2016

Related U.S. Application Data

(60) Provisional application No. 62/093,959, filed on Dec. 18, 2014.

(51) Int. Cl.
| | | |
|---|---|---|
| G01C 15/00 | (2006.01) | |
| G01S 19/45 | (2010.01) | |
| G01C 15/08 | (2006.01) | |
| G01C 11/02 | (2006.01) | |
| G01S 19/14 | (2010.01) | |
| G01S 19/07 | (2010.01) | |
| G01S 19/48 | (2010.01) | |
| G01S 19/26 | (2010.01) | |
| G01S 19/41 | (2010.01) | |

(52) U.S. Cl.
CPC ............ *G01S 19/07* (2013.01); *G01C 11/02* (2013.01); *G01S 19/26* (2013.01); *G01S 19/41* (2013.01); *G01S 19/45* (2013.01); *G01S 19/48* (2013.01)

(58) Field of Classification Search
CPC .......... G01S 19/07; G01S 19/48; G01S 19/41; G01S 19/26; G01S 19/45; G01C 11/02
See application file for complete search history.

(56) References Cited

U.S. PATENT DOCUMENTS

| | | | |
|---|---|---|---|
| 6,507,738 B1 | 1/2003 | Allison et al. | |
| 7,496,241 B1 * | 2/2009 | Reneker | G01C 11/02 382/260 |
| 8,022,868 B2 | 9/2011 | Yudanov et al. | |

(Continued)

OTHER PUBLICATIONS

Non Final Office Action received for U.S. Appl. No. 14/975,181, dated Mar. 30, 2017, 10 Pages.

(Continued)

*Primary Examiner* — Jelani A Smith
*Assistant Examiner* — Majdi Alsomiri
(74) *Attorney, Agent, or Firm* — Morrison & Foerster LLP

(57) ABSTRACT

A method for using a GNSS device to determine a position of an unknown point includes determining positions of a first point, a second point, and a third point using the GNSS device. A first image is captured of the first point using an image sensor, the image includes the unknown point and at least one of the second point or the third point. A second image is captured from the second point; the second image includes the unknown point and at least one of the second point or the third point. A third image is captured from the third point; the third image includes the unknown point and at least one of the second point or the first point. A position of the unknown point is calculated based on the first, second, and third images and the first, second, and third positions.

19 Claims, 15 Drawing Sheets

(56) References Cited

U.S. PATENT DOCUMENTS

| | | | |
|---|---|---|---|
| 8,077,197 B2* | 12/2011 | Ohtomo | G01C 11/02 348/135 |
| 8,094,087 B2 | 1/2012 | Ashjaee et al. | |
| 8,120,527 B2 | 2/2012 | Ashjaee et al. | |
| 8,125,376 B1 | 2/2012 | Ashjaee et al. | |
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,629,988 B2 | 1/2014 | Gribkov | |
| 8,717,232 B2 | 5/2014 | Ashjaee et al. | |
| 8,717,233 B2 | 5/2014 | Ashjaee et al. | |
| 8,872,700 B2 | 10/2014 | Ashjaee et al. | |
| 8,975,967 B2 | 3/2015 | Ashjaee et al. | |
| 9,103,912 B2 | 8/2015 | Yudanov et al. | |
| 9,168,946 B2 | 10/2015 | Ashjaee et al. | |
| 9,228,835 B2 | 1/2016 | Gribkov et al. | |
| 9,250,328 B2 | 2/2016 | Ashjaee et al. | |
| 2002/0189116 A1 | 12/2002 | Yang et al. | |
| 2003/0128161 A1* | 7/2003 | Oh | G01S 13/878 342/387 |
| 2006/0094955 A1* | 5/2006 | Satoh | G01S 5/163 600/426 |
| 2006/0285755 A1* | 12/2006 | Hager | G06K 9/00208 382/224 |
| 2007/0050143 A1 | 3/2007 | Jones | |
| 2007/0100542 A1* | 5/2007 | Courtney | G01C 21/005 701/532 |
| 2007/0167154 A1* | 7/2007 | Ohtomo | G01C 21/28 455/414.2 |
| 2007/0241961 A1 | 10/2007 | Ogawa et al. | |
| 2008/0095402 A1* | 4/2008 | Kochi | G01C 11/00 382/103 |
| 2008/0208454 A1 | 8/2008 | Pesterev et al. | |
| 2008/0292180 A1* | 11/2008 | Kobayashi | G06K 9/209 382/154 |
| 2008/0319664 A1* | 12/2008 | Kremin | G01C 21/005 701/469 |
| 2009/0096790 A1* | 4/2009 | Wiedemann | G06K 9/00201 345/427 |
| 2009/0135057 A1 | 5/2009 | Vollath et al. | |
| 2009/0154793 A1* | 6/2009 | Shin | G06K 9/0063 382/154 |
| 2009/0189804 A1 | 7/2009 | Ashjaee et al. | |
| 2009/0251366 A1 | 10/2009 | McClure et al. | |
| 2011/0091075 A1* | 4/2011 | Schultz | G01C 11/02 382/106 |
| 2011/0150319 A1 | 6/2011 | Ramalingam | G01C 21/3602 382/153 |
| 2011/0153269 A1* | 6/2011 | Lavache | G01S 5/14 702/152 |
| 2011/0158475 A1* | 6/2011 | Otani | G01C 11/30 382/103 |
| 2011/0169946 A1* | 7/2011 | Rudin | G01S 5/16 348/135 |
| 2011/0187590 A1 | 8/2011 | Leandro | |
| 2011/0285587 A1 | 11/2011 | Vollath et al. | |
| 2012/0229333 A1 | 9/2012 | Ashjaee et al. | |
| 2012/0299936 A1 | 11/2012 | Ashjaee et al. | |
| 2013/0001600 A1 | 1/2013 | Lim et al. | |
| 2014/0043187 A1 | 2/2014 | Ellum et al. | |
| 2014/0062778 A1 | 3/2014 | Ashjaee et al. | |
| 2014/0077865 A1 | 3/2014 | Ashjaee et al. | |
| 2014/0253375 A1* | 9/2014 | Rudow | G01S 19/41 342/357.51 |
| 2014/0298666 A1* | 10/2014 | Zogg | G01B 11/27 33/228 |
| 2014/0375493 A1* | 12/2014 | Weisenburger | G01S 19/48 342/357.3 |
| 2014/0378170 A1* | 12/2014 | Rudow | H04W 4/028 455/456.6 |
| 2015/0045058 A1 | 2/2015 | Rudow et al. | |
| 2015/0054685 A1 | 2/2015 | Ashjaee | |
| 2015/0100269 A1 | 4/2015 | Ashjaee | |
| 2015/0116145 A1 | 4/2015 | Ashjaee | |
| 2015/0125044 A1* | 5/2015 | Rudin | G01S 5/16 382/106 |
| 2015/0234055 A1 | 8/2015 | Ashjaee et al. | |
| 2015/0323676 A1 | 11/2015 | Ashjaee et al. | |
| 2016/0018530 A1 | 1/2016 | Ashjaee | |
| 2016/0041268 A1 | 2/2016 | Ashjaee | |
| 2016/0178369 A1 | 6/2016 | Ashjaee | |
| 2016/0178754 A1 | 6/2016 | Ashjaee | |

OTHER PUBLICATIONS

Final Office Action received for U.S. Appl. No. 14/975,189, dated May 1, 2019, 16 pages.

Final Office Action received for U.S. Appl. No. 14/975,181, dated Oct. 31, 2017, 16 pages.

Non-Final Office Action received for U.S. Appl. No. 14/975,181, dated Aug. 7, 2018, 15 pages.

Non-Final Office Action received for U.S. Appl. No. 14/975,189, dated Jul. 10, 2018, 18 pages.

Notice of Allowance received for U.S. Appl. No. 14/975,181, dated Feb. 27, 2019, 8 pages.

* cited by examiner

PORTABLE GNSS SURVEY SYSTEM

CROSS REFERENCE TO RELATED APPLICATIONS

This application claims the benefit to U.S. Provisional Patent Application No. 62/093,959, filed Dec. 18, 2014, the disclosure of which is hereby incorporated herein by reference in its entirety for all purposes.

BACKGROUND

1. Field

The present disclosure relates generally to geodesy and precise positioning of a handheld geodesic device.

2. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a base receiver or a network of base receivers with the assumption that the positional coordinates of the base receiver(s) are known with high accuracy. The base receiver or receiver network transmits its measurements (or corrections to the full measurements) to a mobile navigation receiver (or rover). The rover receiver uses these corrections to refine its measurements in the course of data processing. The rationale for this approach is that since the pseudo-range measurement errors on the base and rover sides are strongly correlated, using differential measurements will substantially improve positioning accuracy.

Typically, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using an RTK algorithm, which may be stored in memory on the rover. As the name "real-time kinematic" implies, the rover receiver is capable of calculating/outputting its precise position as the raw data measurements and differential corrections become available at the rover. When implementing an RTK algorithm, a data communication link (e.g., a radio communication link, a GSM binary data communication link, etc.) may be used to transmit the necessary information from the base to the rover.

Further improvement of the accuracy in differential navigation/positioning applications can be achieved by using both the carrier phase and pseudo-range measurements from the satellites to which the receivers are locked. For example, by measuring the carrier phase of the signal received from a satellite in the base receiver and comparing it with the carrier phase of the same satellite measured in the rover receiver, one can obtain measurement accuracy to within a small fraction of the carrier's wavelength.

One well-known type of measurement error that can reduce the accuracy of differential navigation/positioning is multipath error. Multipath errors are caused by the reflection of the GNSS satellite signals by surfaces located near the receiving antenna. As a result of these reflections, the antenna receives both the direct signal traveling the shortest path from the satellite to the receiver as well as the reflected signals following indirect paths. The combination of two (or more) signals at the antenna leads to the distortion of raw measurements. Multipath errors may affect both pseudo-range and carrier phase measurements.

SUMMARY

An embodiment of the invention includes a method for using a GNSS device to determine a position of an unknown point includes determining positions of a first point, a second point, and a third point using the GNSS device. A first image is captured of the first point using an image sensor; the first image includes the unknown point and at least one of the second point or the third point. A second image is captured from the second point; the second image includes the unknown point and at least one of the second point or the third point. A third image is captured from the third point; the third image includes the unknown point and at least one of the second point or the first point. A position of the unknown point is calculated based on the first, second, and third images and the first, second, and third positions.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Systems and methods for performing land surveying using RTK engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

Figure 1:
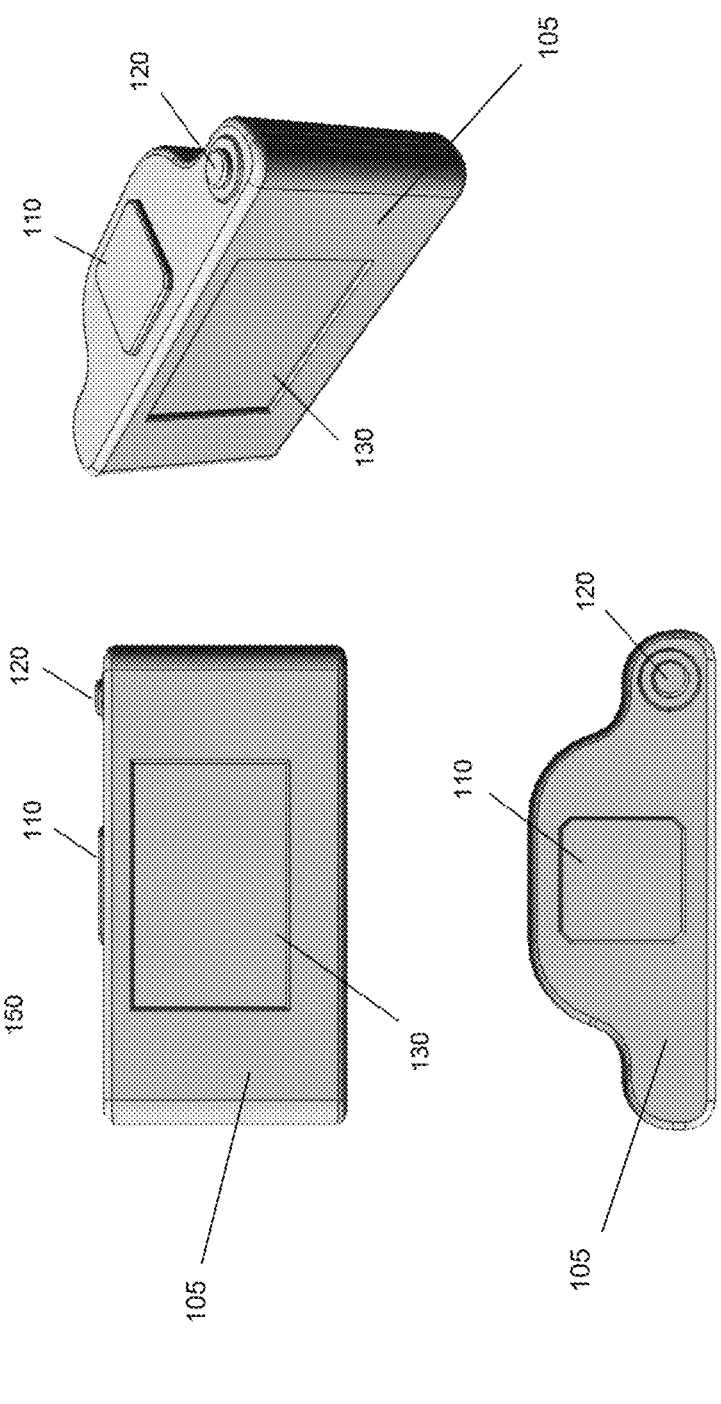
FIG. 1 illustrates an exemplary graphics-aided geodesic device viewed from various angles.

FIG. 1 illustrates an exemplary graphics-aided geodesic device 100 viewed from various angles. Graphics-aided geodesic device 100 is shown contained within camera housing 105. Camera housing 105 allows the user to hold graphics-aided geodesic device 100 as one would hold a typical camera. In one example, the device may include GNSS antenna 110 which may receive signals transmitted by a plurality of GNSS satellites and used by graphics-aided geodesic device 100 to determine position. In one example, GNSS antenna may receive signals transmitted by at least 4 GNSS satellites. In the example shown by FIG. 1, GNSS antenna 110 is located on the top side of graphics-aided geodesic device 100.

Graphics-aided geodesic device 100 may further include a GNSS receiver (not shown) for converting the signal received by GNSS antenna 110 into Earth-based coordinates, for example, World Geodetic System 84(WGS84), Earth-Centered Earth Fixed (ECEF), local east, north, up coordinates (ENU), and the like. Such receivers are well-known by those of ordinary skill in the art and any such device may be used.

Graphics-aided geodesic device 100 may further include "measure" button 120 to cause the device to perform a position measurement. In one example, this button may be similar to that of a conventional camera. However, instead of taking a photograph, "measure" button 120 may cause graphics-aided geodesic device 100 to perform a position measurement as described in greater detail below. In the example shown by FIG. 1, "measure" button 120 is located on the top side of graphics-aided geodesic device 100.

Graphics-aided geodesic device 100 may further include display 130 for displaying information to assist the user in positioning the device. Display 130 may be any electronic display such as a projection display, a liquid crystal (LCD) display, light emitting diode (LED) display, a plasma display, and the like. Such display devices are well-known by those of ordinary skill in the art and any such device may be used. In the example shown by FIG. 1, display 130 is located on the back side of graphics-aided geodesic device 100.

Graphics-aided geodesic device 100 may further include camera 140 for recording still images or video. Such recording devices are well-known by those of ordinary skill in the art and any such device may be used. In the example illustrated by FIG. 1, camera 140 is located on the bottom side of graphics-aided geodesic device 100. A more detailed description of the positioning of camera 140 will be provided below with respect to FIGS. 2A-C. In one example, display 130 may be used to display the out put of camera 140. Thus, when held upright, display 130 displays a view of the ground located below graphics-aided geodesic device 100.

Graphics-aided geodesic device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 130. A more detailed description of display 130 is provided below. Horizon sensors 215 and 216 are illustrated in FIGS. 2A-2C and FIG. 3.

The horizon sensors 215 and 216, by determining the inclination of the geodesic device 100, allow a CPU to compensate for errors resulting from the mis-leveling of the geodesic device 100. A user taking a position measurement may position the geodesic device 100 so that it is not level with respect to a plane parallel to the horizon. However, the CPU 360 (FIG. 3) of the geodesic device 100, receiving orientation data from the horizon sensors 215 and 216, can compensate the position determination as long as the inclination of the geodesic device 100 is below an inclination threshold. In this way, the orientation data, indicating the orientation of the GNSS antenna 110, may be used by the CPU 360 to correct for errors in the position data received by the GNSS antenna 360. (The position determination and compensation by the CPU 360 is generally discussed below). For example, a geodesic device 100 may be configured to have an inclination error of 15 degrees. As such, if the inclination of the geodesic device 100 is between 0 to 15 degrees with respect to a plane parallel to the horizon, the CPU 360 will determine the position of the point of interest.

Furthermore, the horizon sensors 215 and 216 determining the inclination of the geodesic device 100 with respect to a plane parallel with the horizon may be used to determine when the CPU 360 of the geodesic device 100 determines the position of a point of interest. The horizon sensors 215 and 216 measure the inclination of the geodesic device 100 with respect to a plane parallel to the horizon. The CPU 360 automatically begins determining the position of a point of interest when the inclination of the geodesic device 100 enters a predetermined inclination range. The CPU 360 continues determining position of the point of interest as long as the inclination of the geodesic device 100 is within the predetermined inclination range. If the inclination is measured to be outside the predetermined inclination range, the CPU 360 suspends determining the position of the point of interest. For example, the user of the geodesic device 100 may indicate that a position measurement should be taken at an inclination of 0 to 15 degrees from a plane parallel with the horizon. When the user holding the geodesic device 100 positions the geodesic device at 5 degrees, the position measurement by the CPU 360 starts automatically. Similarly, when the user tilts the geodesic device 100 so the inclination is no longer within the range of 0 to 15 degrees, the CPU 360 suspends the position measurement. In other words, the user may set a predetermined inclination range at which the CPU 360 will initiate the position measurement. Thus, by measuring the inclination of the geodesic device 100 during positioning by the user, the position measurement by the CPU 360 starts and stops depending on the positioning and orientation of the geodesic device 100. In this way, the user does not need to activate the position determination by depressing a start and stop key, for example. Moreover, the user does not need to search for a start or stop button to take a position measurement when environmental conditions, such as bright sunlight and darkness, may make it challenging for the user to find specific soft keys or hard buttons, respectively.

Moreover, if the horizon sensors 215 and 216 determines the inclination to be more than a predetermined threshold inclination, the CPU 360 deactivates buttons and touch display screen so that they do not respond to user actuation input or inadvertently activated. The CPU 360 deactivates, or locks, the function of buttons and the touch screen when the horizon sensors 215 and 216 determine the geodesic device 100 is inclined more than a predetermined threshold inclination. In one example, the buttons and display screen of the geodesic device 100 locks when the horizon sensors 215 and 216 determines the inclination of the geodesic device 100 is more than 30 degrees.

Graphics-aided geodesic device 100 may further include distance sensor 150 to measure a linear distance. Distance sensor 150 may use any range-finding technology, such as sonar, laser, radar, and the like. Such distance sensors are well-known by those of ordinary skill in the art and any such device may be used. In the example illustrated by FIG. 1, distance sensor 150 is located on the bottom side of graphics-aided geodesic device 100.

Figure 2A:
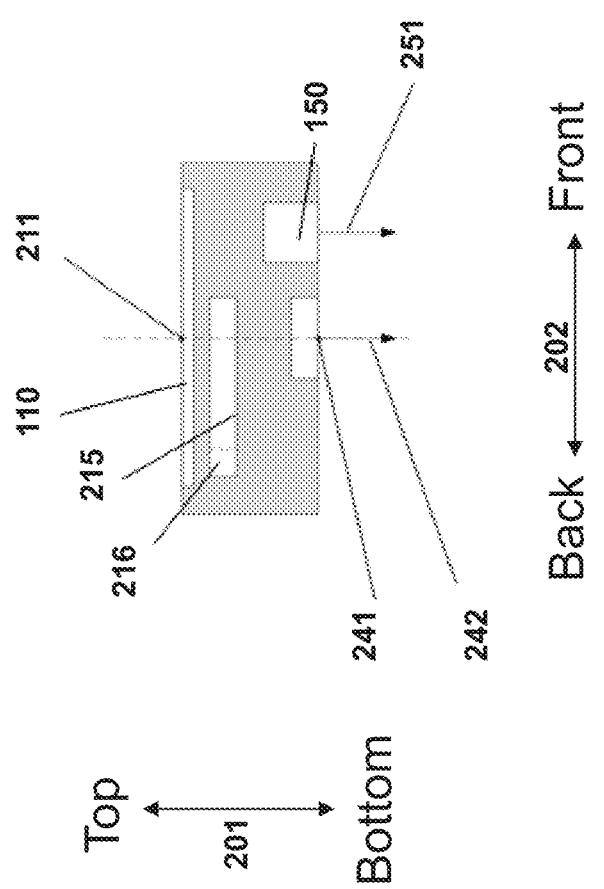
FIG. 2A illustrates an exemplary view of the orientation of the components of a graphics-aided geodesic device.
Figure 2B:
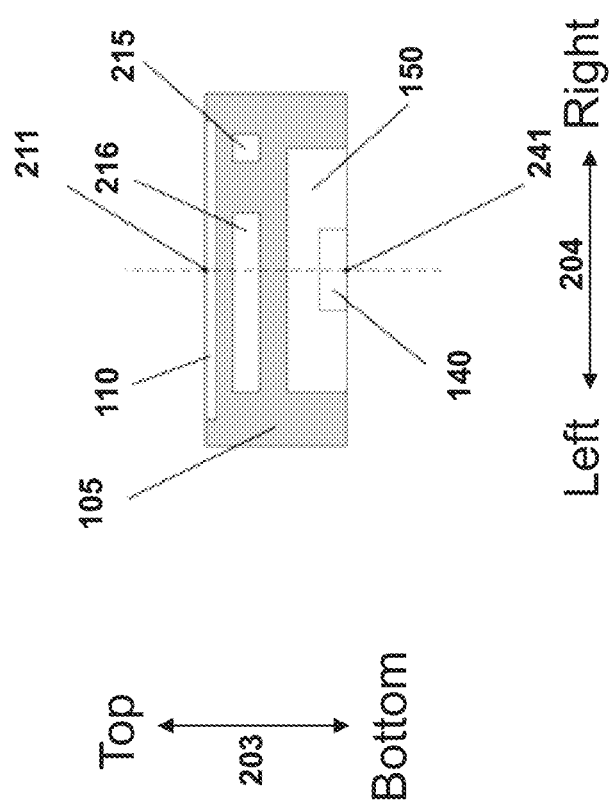
FIG. 2B illustrates another exemplary view of the orientation of the components of a graphics-aided geodesic device.
Figure 2C:
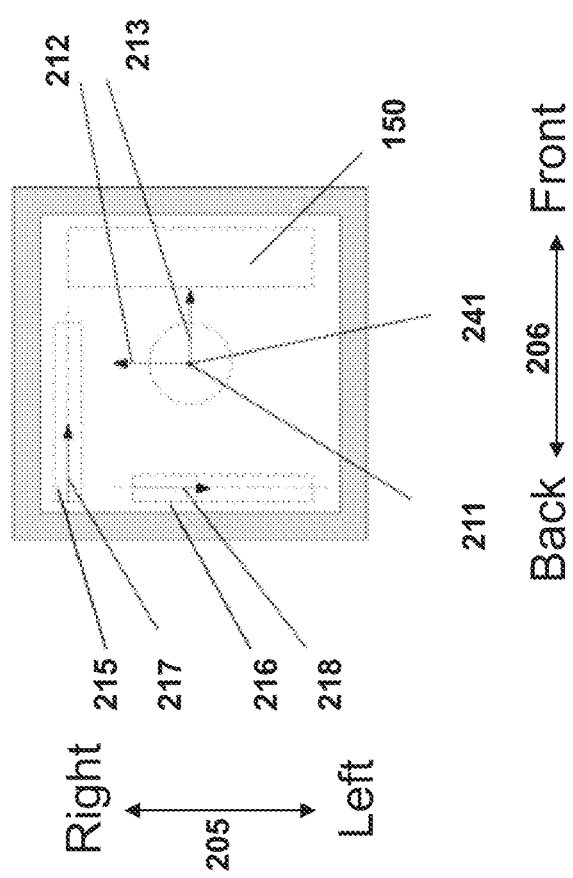
FIG. 2C illustrates yet another exemplary view of the orientation of the components of a graphics-aided geodesic device.

FIGS. 2A-C illustrate exemplary views of graphics-aided geodesic device 100 and the orientation of its components from various angles. FIG. 2A shows a side view of graphics-aided geodesic device 100 with arrows 201 and 202 indicating the top/bottom and front/back of the device, respectively. FIG. 2B shows graphics-aided geodesic device 100 viewed from the back with arrows 203 and 204 indicating the top/bottom and left/right side of the device, respectively. FIG. 2C shows a bottom view of graphics-aided geodesic device 100 with arrows 205 and 206 indicating the right/left side and front/back of the device, respectively.

In the examples illustrated by FIGS. 2A-C, camera housing 105 contains antenna 110, horizon sensors 215 and 216, distance sensor 150, and camera 140. The orientation of the components will be described herein with the use of vectors which indicate a direction in space. For instance, antenna 110 has an antenna ground plane defined by antenna phase center 211 and two ground plane vectors 212 and 213. In one example, ground plane vectors 212 and 213 are parallel or substantially parallel to the local horizon. Camera 140 has optical center 241 located along camera optical axis 242. Camera optical axis 242 passes through antenna phase center 211 and is orthogonal or substantially orthogonal to ground plane vectors 212 and 213. Distance sensor 150 has distance sensor main axis (measuring direction) 251 which is parallel or substantially parallel to camera optical axis 242. Horizon sensors 215 and 216 have orthogonal or substantially orthogonal measurement vectors 217 and 218 which create a plane parallel or substantially parallel to the antenna ground plane defined by ground plane vectors 212 and 213. It should be appreciated that in a real-world application, the components of graphics-aided geodesic device 100 may not be positioned exactly as described above. For instance, due to manufacturing imperfections, the orientations of certain components may not be parallel or orthogonal to the other components as designed. The tolerances for the orientations of the various components depend on the desired precision of the resulting position measurement.

Figure 3:
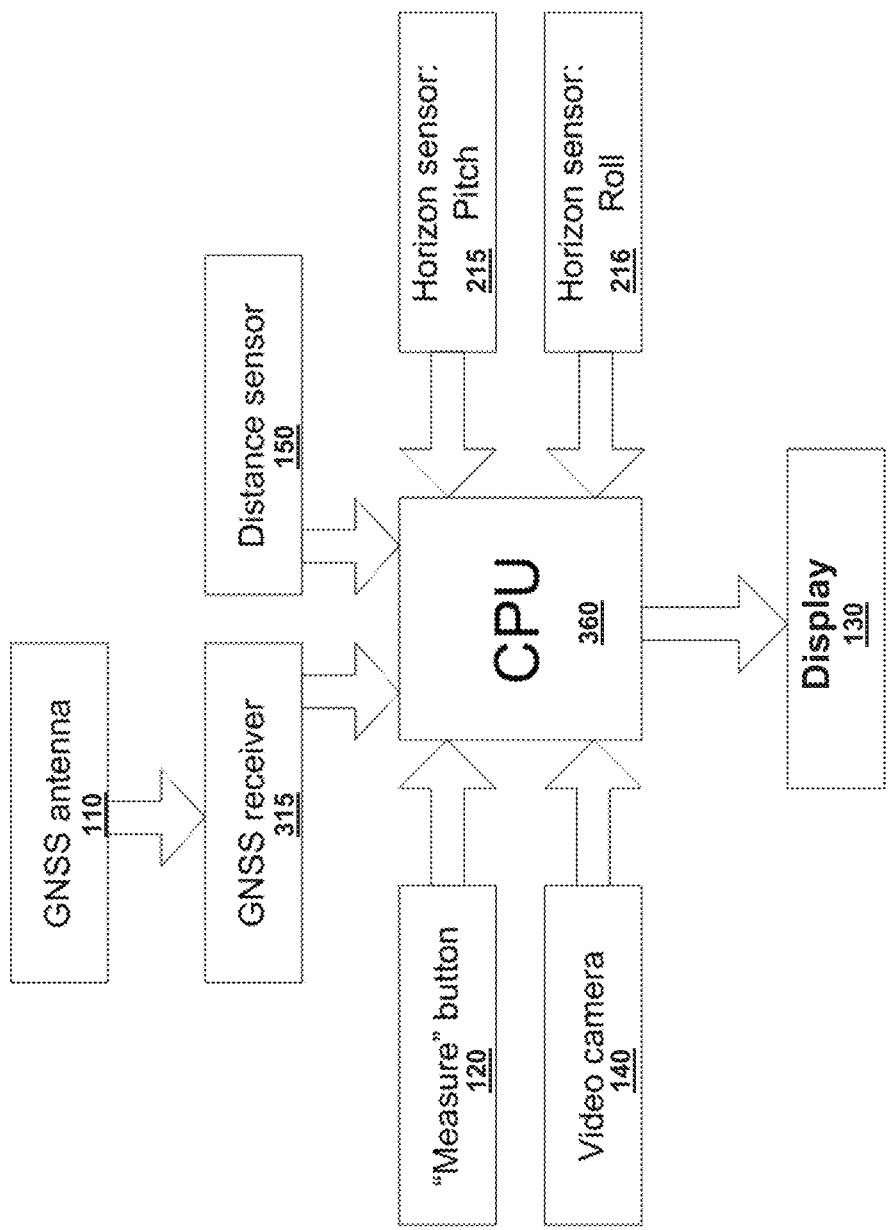
FIG. 3 illustrates an exemplary logic diagram showing the relationships between the various components of a graphics-aided geodesic device.

FIG. 3 illustrates an exemplary logic diagram showing the relationships between the various components of graphics-aided geodesic device 100. In one example, GNSS antenna 110 may send position data received from GNSS satellites to GNSS receiver 315. GNSS receiver 315 may convert the received GNSS satellite signals into Earth-based coordinates, such as WGS84, ECEF, ENU, and the like. GNSS receiver 315 may further send the coordinates to CPU 360 for processing along with distance data from distance sensor 150, pitch data from pitch horizon sensor 215, roll data from roll horizon sensor 216, a measure command from "measure" button 120, and image data from video camera 140. CPU 360 processes the data as will be described in greater detail below and provides display data to be displayed on display 130. The GNSS receiver may also include one or more communication interfaces (not shown) as discussed in detail below. These communication interfaces may be used to transmit and receive position data, correction signals, and other data.

Figure 4:
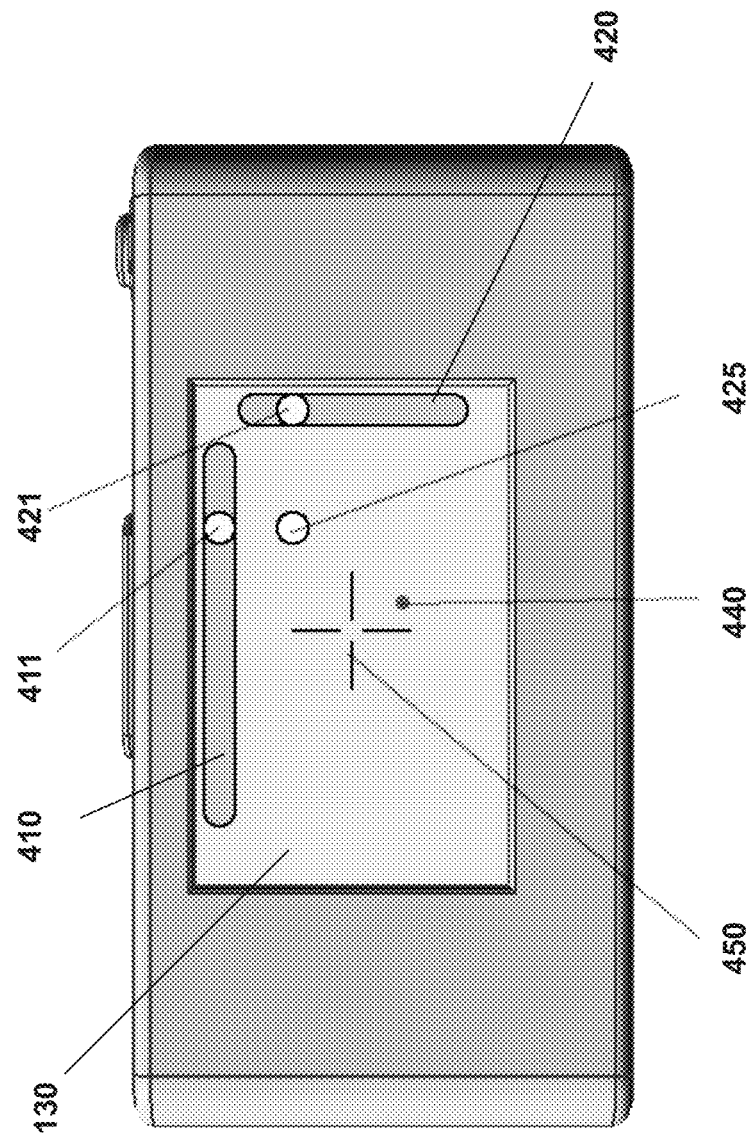
FIG. 4 illustrates an exemplary view of the display screen of a graphics-aided geodesic device including elements used for positioning the device.

FIG. 4 illustrates an exemplary view 400 of display 130 for positioning graphics-aided geodesic device 100. In one example, display 130 may display the output of camera 140. In this example, the display of the output of camera 140 includes point of interest marker 440. As shown in FIG. 4, point of interest marker 440 is a small circular object identifying a particular location on the ground. In the examples provided herein, we assume that the location to be measured is located on the ground and that the point of interest is identifiable by a visible marker (e.g., point of interest marker 440). The marker may be any object having a small height value. For instance, an "X" painted on ground or a circular piece of colored paper placed on the point of interest may serve as point of interest marker 440.

In another example, display 130 may further include virtual linear bubble levels 410 and 420 corresponding to the roll and pitch of graphics-aided geodesic device 100, respectively. Virtual linear bubble levels 410 and 420 may include virtual bubbles 411 and 421 which identify the amount and direction of roll and pitch of graphics-aided geodesic device 100. Virtual linear bubble levels 410 and 420 and virtual bubbles 411 and 421 may be generated by CPU 360 and overlaid on the actual image output of camera 140. In one example, positioning of virtual bubbles 411 and 421 in the middle of virtual linear bubble levels 410 and 420 indicate that the device is positioned "horizontally." As used herein, "horizontally" refers to the orientation whereby the antenna ground plane is parallel to the local horizon.

In one example, data from horizon sensors 215 and 216 may be used to generate the linear bubble levels 410 and 420. For instance, sensor data from horizon sensors 215 and 216 may be sent to CPU 360 which may convert a scaled sensor measurement into a bubble coordinate within virtual linear bubble levels 410 and 420. CPU 360 may then cause the display on display 130 of virtual bubbles 411 and 421 appropriately placed within virtual linear bubble levels 410 and 420. Thus, virtual linear bubble levels 410 and 420 may act like traditional bubble levels, with virtual bubbles 411 and 421 moving in response to tilting and rolling of graphics-aided geodesic device 400. For example, if graphics-aided geodesic device 100 is tilted forward, bubble 420 may move downwards within virtual linear bubble level 420. Additionally, if graphics-aided geodesic device 100 is rolled to the left, virtual bubble 411 may move to the right within virtual linear bubble level 410. However, since virtual linear bubble levels 410 and 420 are generated by CPU 360, movement of virtual bubbles 411 and 421 may be programmed to move in any direction in response to movement of graphics-aided geodesic device 100.

In another example, display 130 may further include planar bubble level 425. Planar bubble level 425 represents a combination of virtual linear bubble levels 410 and 420 (e.g., placed at the intersection of the bubbles within the linear levels) and may be generated by combining measurements of two orthogonal horizon sensors (e.g., horizon sensors 215 and 216). For instance, scaled measurements of horizon sensors 215 and 216 may be converted by CPU 360 into X and Y coordinates on display 130. In one example, measurements from horizon sensor 215 may be used to generate the X coordinate and measurements from horizon sensor 216 may be used to generate the Y coordinate of planar bubble level 425.

As shown in FIG. 4, display 130 may further include central crosshair 450. In one example, central crosshair 450 may be placed in the center of display 130. In another example, the location of central crosshair 450 may represent the point in display 130 corresponding to the view of camera 140 along optical axis 242. In yet another example, placement of planar bubble level 425 within central crosshair 450 may correspond to graphics-aided geodesic device 100 being positioned horizontally. Central crosshair 450 may be drawn on the screen of display 130 or may be electronically displayed to display 130.

Display 130 may be used to aid the user in positioning graphics-aided geodesic device 100 over a point of interest by providing feedback regarding the placement and orientation of the device. For instance, the camera output portion of display 130 provides information to the user regarding the placement of graphics-aided geodesic device 100 with respect to objects on the ground. Additionally, virtual linear bubble levels 410 and 420 provide information to the user regarding the orientation of graphics-aided geodesic device 100 with respect to the horizon. Using at least one of the two types of output displayed on display 130, the user may properly position graphics-aided geodesic device 100 without the use of external positioning equipment.

In the example illustrated by FIG. 4, both point of interest marker 440 and planar bubble level 425 are shown as off-center from central crosshair 450. This indicates that optical axis 242 of camera 140 is not pointed directly at the point of interest and that the device is not positioned horizontally. If the user wishes to position the device horizontally above a particular point on the ground, the user must center both planar bubble level 425 and point of interest marker 440 within central crosshair 450 as shown in FIG. 5.

Figure 5:
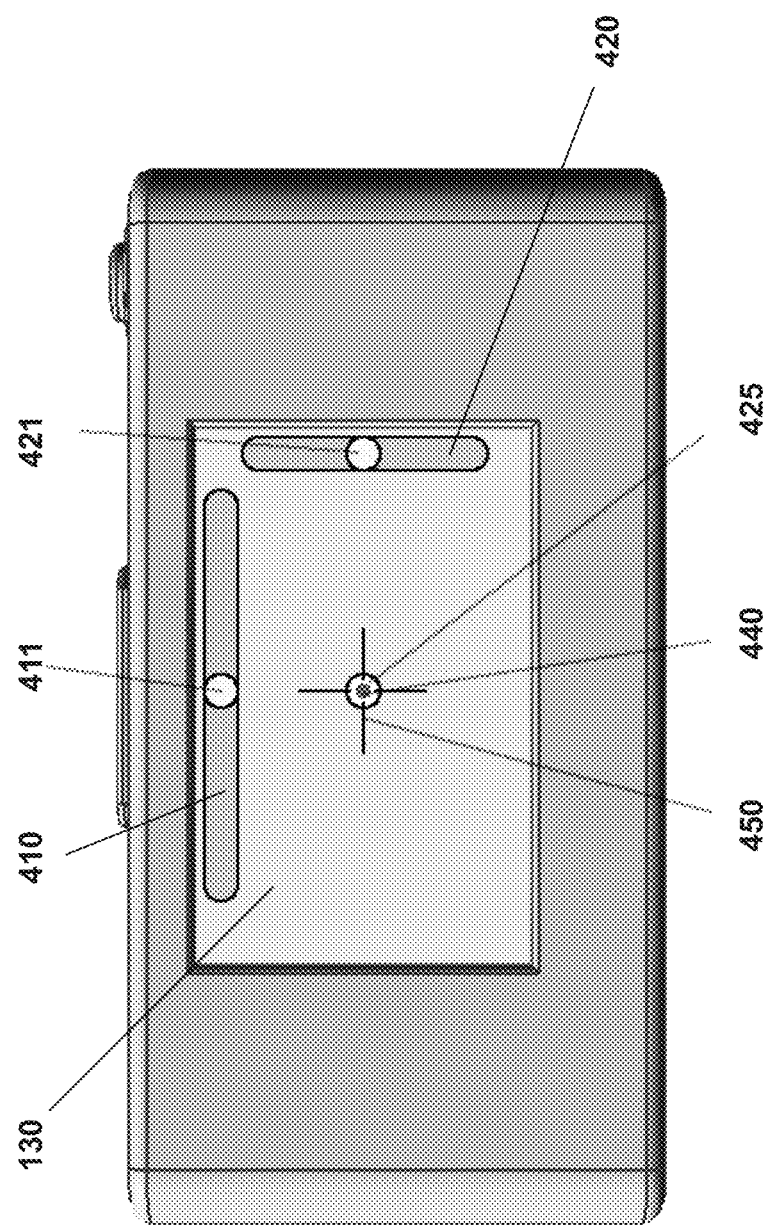
FIG. 5 illustrates another exemplary view of the display screen of a graphics-aided geodesic device oriented horizontally and above a point of interest.

FIG. 5 illustrates another exemplary view 500 of display 130. In this example, virtual linear bubble levels 410 and 420 are shown with their respective bubbles centered, indicating that the device is horizontal. As such, planar bubble level 425 is also centered within central crosshair 450. Additionally, in this example, point of interest marker 440 is shown as centered within central crosshair 450. This indicates that optical axis 242 of camera 140 is pointing towards point of interest marker 440. Thus, in the example shown by FIG. 5, graphics-aided geodesic device 100 is positioned horizontally above point of interest marker 440.

As discussed above with respect to FIG. 2, antenna phase center 211 may be located along optical axis 242. This means that in the example shown by FIG. 5, antenna phase center 211 is also located directly above point of interest marker 440. Thus, the only difference between the position of antenna phase center 211 and point of interest marker 440 is a vertical component equal to the vertical distance between point of interest marker 440 and antenna phase center 211. In this example, the position of point of interest marker 440 may be calculated using the following equation:

$$\vec{P}_x = \vec{P}_{dev} - \vec{n}(D_{in} + D_{out}) \qquad (1)$$

Where:

$\vec{P}_x$—Calculated position of the point of interest.

$\vec{P}_{dev}$—Measured GNSS position of the device antenna phase center.

$\vec{n}$—Unit vector orthogonal to the ground.

$D_{in}$—Vertical distance between antenna phase center 211 and the zero measurement point of distance sensor 150.

$D_{out}$—Distance measured by distance sensor 150 from the sensor's zero measurement point to an object along distance sensor main axis 251.

As shown above, $\vec{P}_x$ of equation (1) represents the calculated position of the point of interest. $\vec{P}_{dev}$ represents the position of antenna phase center 211 determined by graphics-aided geodesic device 100. $\vec{n}$ represents a unit vector pointing in a direction orthogonal to the ground. $D_{in}$ represents the vertical distance between antenna phase center 211 and the zero measurement point of distance sensor 150. The zero measurement point of distance sensor 150 is the point in space for which distance sensor 150 is configured to return a zero value and may be located either inside or outside of graphics-aided geodesic device 100. Thus, $D_{in}$ is a constant value that is specific to each graphics-aided geodesic device 100. Finally, $D_{out}$ represents the distance measured by distance sensor 150 from the sensor's zero measurement point to an object along distance sensor main axis 251. Therefore, $\vec{P}_x$ is calculated by taking the position measured by graphics-aided geodesic device 100 and subtracting a vertical distance equal to the distance measured by distance sensor 150 plus the distance between antenna phase center 211 and the zero measurement point of distance sensor 150.

It should be appreciated that the coordinates used in equation (1) may be expressed in any coordinate system. For example, the above described equation may be applicable to any Cartesian coordinate system and the measurement results may be converted to any Earth-based coordinates, such as WGS84, ECEF, ENU, and the like. Such conversion methods are well-known by those of ordinary skill in the art.

A more detailed description of determining a position based on signals from GNSS satellites and base stations is available in U.S. patent application Ser. No. 12/070,333, filed Feb. 15, 2008, published as U.S. Patent Publication No. 2008/0208454 and Ser. No. 12/360,808, filed Jan. 27, 2009, published as U.S. Patent Publication No. 2009/0189804 assigned to the assignee of the present invention, and each of which are incorporated herein by reference in their entirety for all purposes.

Offset Survey

Sometimes a position of a point cannot be determined with direct GNSS measurements from that point. The point may be inaccessible, have no access to GNSS signals, or may be a feature on an object where a GNSS device cannot be setup. In these circumstances, the exemplary process described below may be used with a GNSS device, such as graphics-aided geodesic device 100, to determine the position of the point based on a series of images containing the point captured from various known points.

Figure 6:
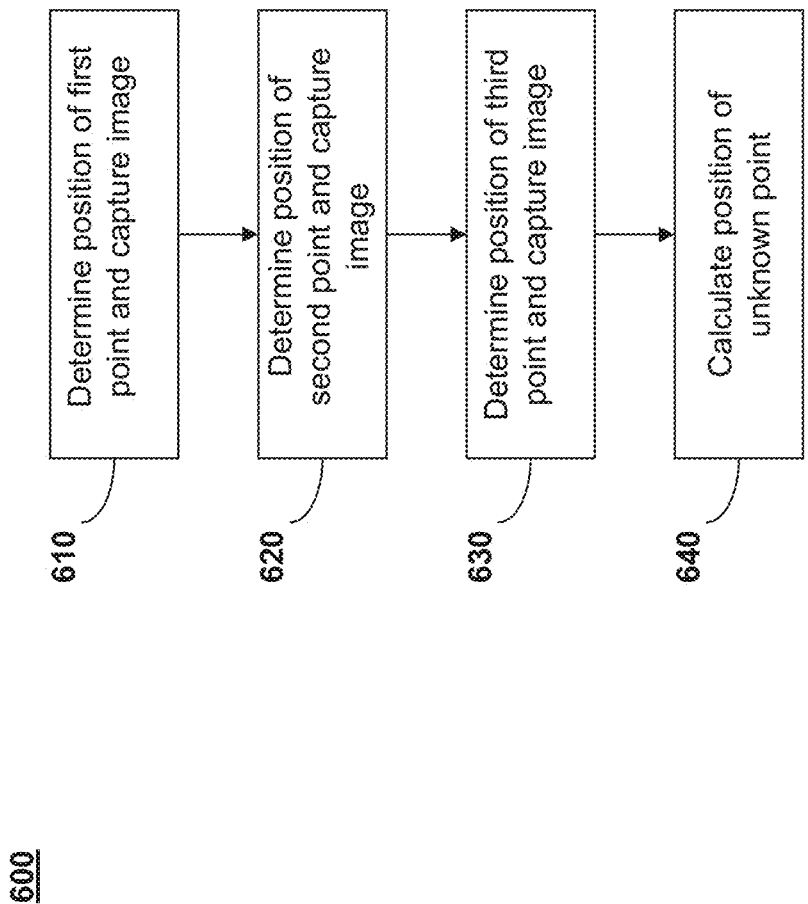
FIG. 6 illustrates an exemplary process for determining a position of an unknown point.

FIG. 6 illustrates an exemplary process 600 for determining a position (e.g., x-y coordinates, x-y-z coordinates, latitude-longitude, latitude-longitude-altitude, etc.) of an unknown point using, for example, graphics-aided geodesic device 100 (FIG. 1). By taking at least three images of the unknown point from three known points, an accurate position of the unknown point may be determined if each image includes one of the known points in addition to the unknown point. This process is further described below with respect to FIGS. 7-10. Accuracy may be improved further if each of the know points is indicated by a physical marker in the images.

Figure 7:
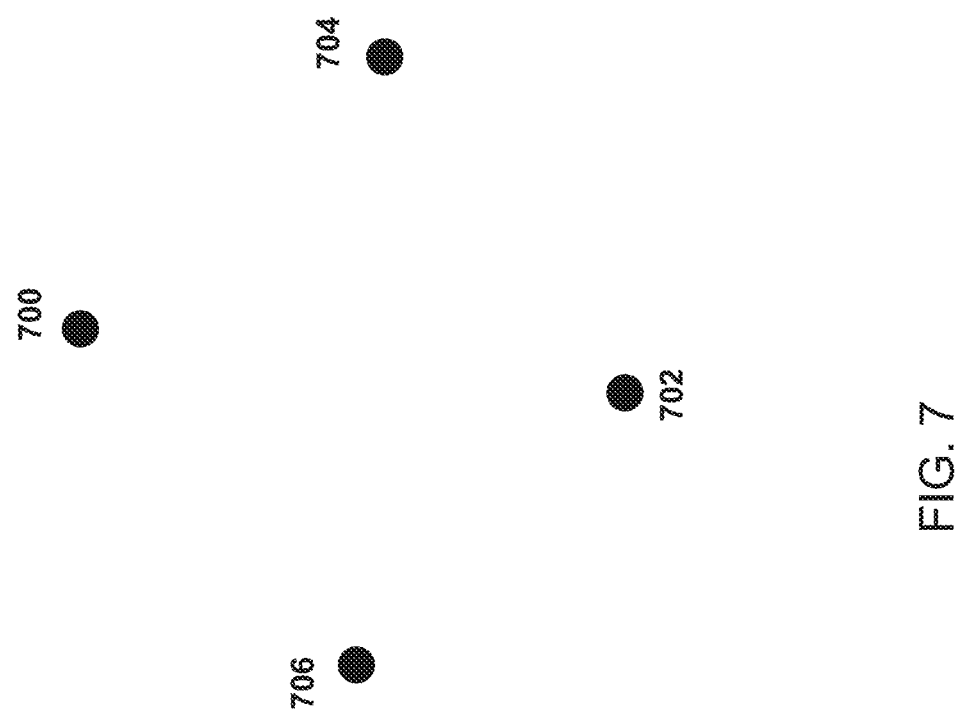
FIGS. 7-10 illustrates an exemplary layout of an unknown point and three known points from which images are captured.
Figure 8:
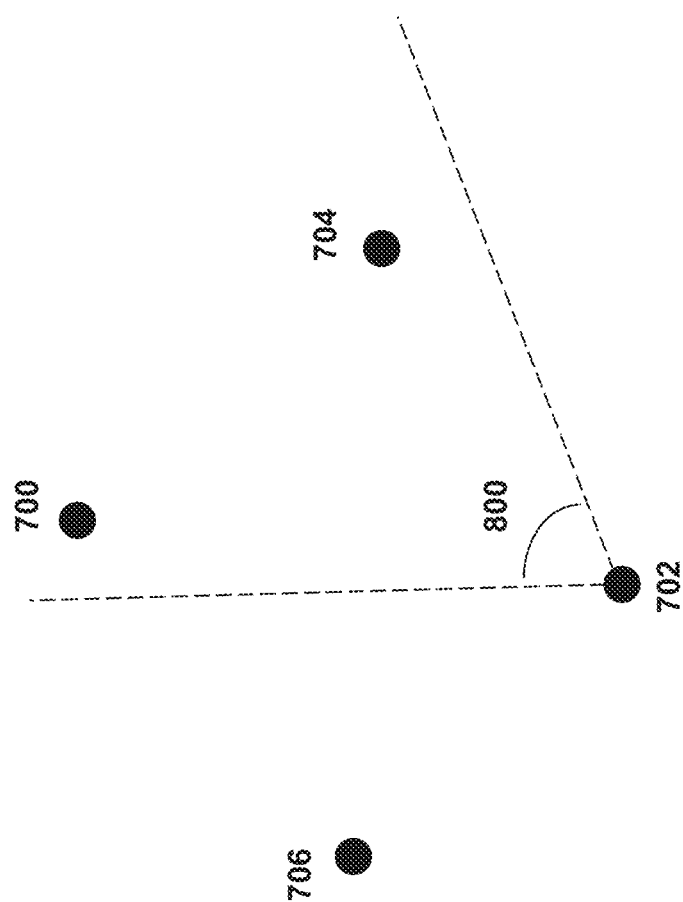
Figure 9:
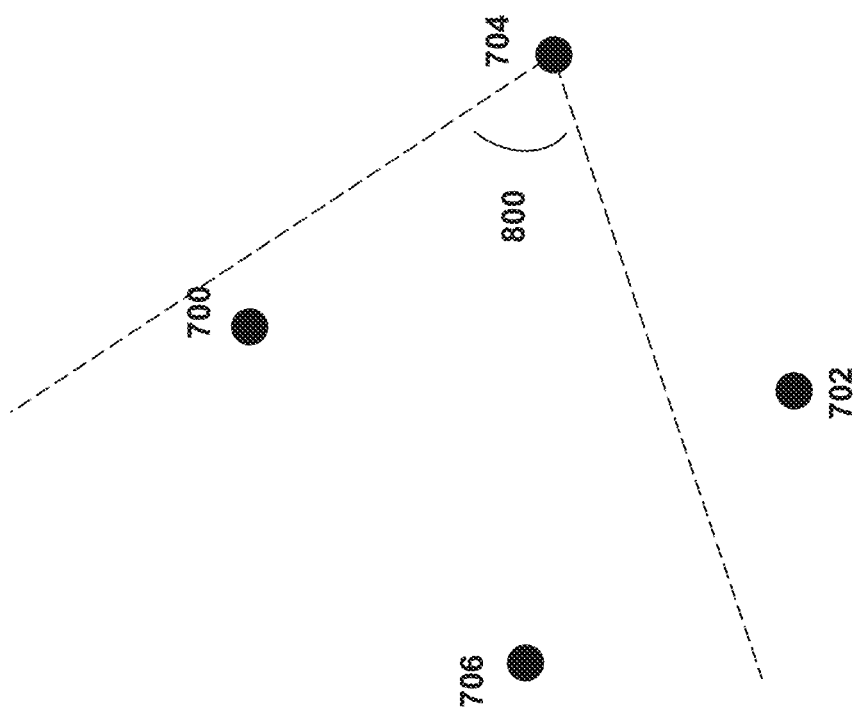
Figure 10:
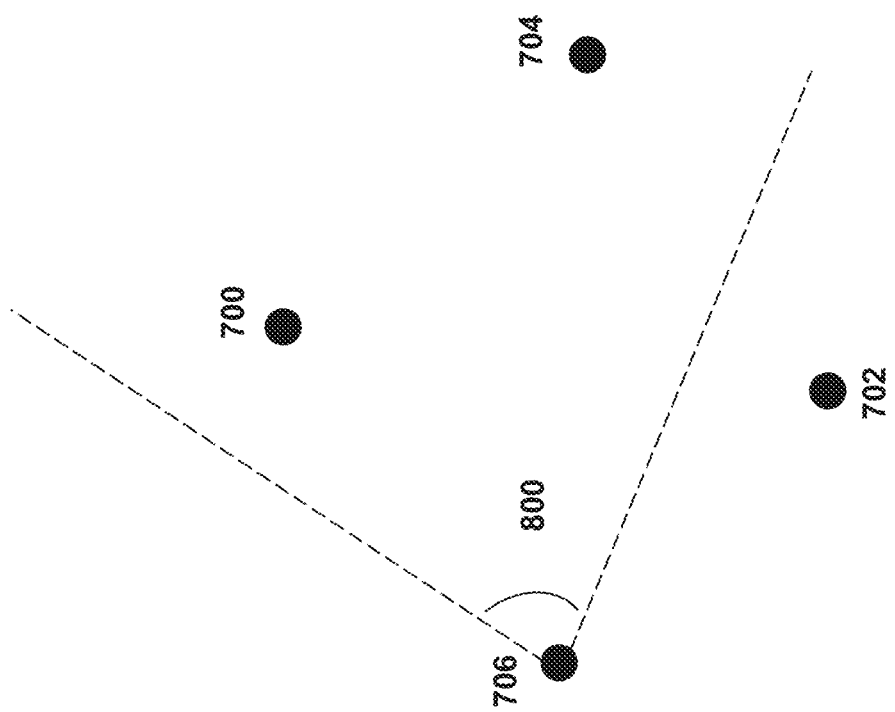

At block 602 graphics-aided geodesic device 100 determines the position of a first point (e.g., by using received GNSS signals) and captures an image of the unknown point and at least one of either the second point or the third point. For example, FIG. 7 depicts unknown point 700, first point 702, second point 704, and third point 706. In FIG. 8, an image sensor, having field of view 800, of graphics-aided geodesic device 100 (not shown) captures an image from first point 702 that includes unknown point 700 and second point 704. The position of the first point may be associated with or stored within the first image captured from the first point using, for example, metadata of the image.

At block 604 graphics-aided geodesic device 100 determines the position of the second point (e.g., by again using received GNSS signals) and captures an image of the unknown point and at least one of the first point or the third point. For example, in FIG. 9, the image sensor, which has field of view 800, of graphics-aided geodesic device 100 (not shown) captures an image from second point 704 that includes unknown point 700 and third point 706. The position of the second point may be associated with or stored within the second image captured from the first point using, for example, metadata of the image.

At block 606 graphics-aided geodesic device 100 determines the position of the third point (e.g., by again using received GNSS signals) and captures an image of the unknown point and at least one of the first point or the second point. For example, in FIG. 10, the image sensor, which has field of view 800, of graphics-aided geodesic device 100 (not shown) captures an image from second point 704 that includes unknown point 700 and second point 704. The position of the third point may be associated with or stored within the third image captured from the first point using, for example, metadata of the image.

At block 608 graphics-aided geodesic device 100 or a computer calculates the position of the unknown point based on the positions of the first, second, and third points and the images captured from the first, second, and third points. This calculation may be performed with, for example, a photogrammetric algorithm.

To improve accuracy of the calculated position of the unknown point, a marker may be placed at the first, second, or third points (or any combination of these points). The marker may be a flag, paint, a stake, or any other object that allows the first, second or third point to be identified in the images.

While the above process was described with respect to graphics-aided geodesic device 100, other geodesic devices may also be used. For example, a geodesic device without an image sensor could be used if the geodesic device is paired with an external image sensor.

Verified Base RTK

RTK productivity typically improves when the base station is close to the rover. Searching for "integer ambiguity" and having a correct "fixed solution" may become more reliable, faster, and accurate. These improvements may be greater in areas with foliage, multipath, and obstructed satellites. RTN and VRS systems provide a "virtual" base station near you, but this does not mean that the "virtual" base station is a "real" base station that eliminates the integer ambiguity problem. The difficulties of obtaining a fixed solution is still related to the nearest actual base station to your location. There are two problems with depending on your own base station near your rover working area. The following are explanations of both and solutions:

First is the financial investment in an additional receiver. In fact, having a separate base station can be less costly, because it eliminates the need to pay for RTN services and communication costs. Another financial benefit is that productivity increases and more points per hour can be gathered: get a fixed solution and collect a point in seconds rather than minutes, particularly in difficult areas. Also, it eliminates the need to re-observe a point.

Second, the user may not have a known point to set the base station on, or lack confidence in the coordinates of the point. Using a verified base (VB) addresses this problem. The embodiments of the invention may implement a VB reliably and automatically. The results of using a VB RTK system may outperform RTN/VRS systems because in those system the nearest actual "real" base station is often many miles away, while a user can set up a base station near the RTK work area, usually less than a mile away.

In a VB RTK system, a GNSS base unit records raw GNSS data at the base station and transmits corrections to a GNSS rover, such as graphics-aided geodesic device 100. Once position data for a set of points is collected, the user returns to the GNSS base unit and retrieves the raw GNSS data from the GNSS base unit. The raw GNSS data can then be processed against correction data (e.g., NGS CORS data) to produce a corrected position of the GNSS base unit. The position data from the GNSS rover unit is then adjusted according to the corrected position of the GNSS base unit.

A VB RTK system is useful even in situations in which the base was setup on a known point as the corrected position for the GNSS base unit can be compared against the known point coordinates to verify the GNSS base unit position (e.g., setup on the right point, the point had not been damaged, the coordinates were properly entered, the instrument height was correct, etc.).

Figure 11:
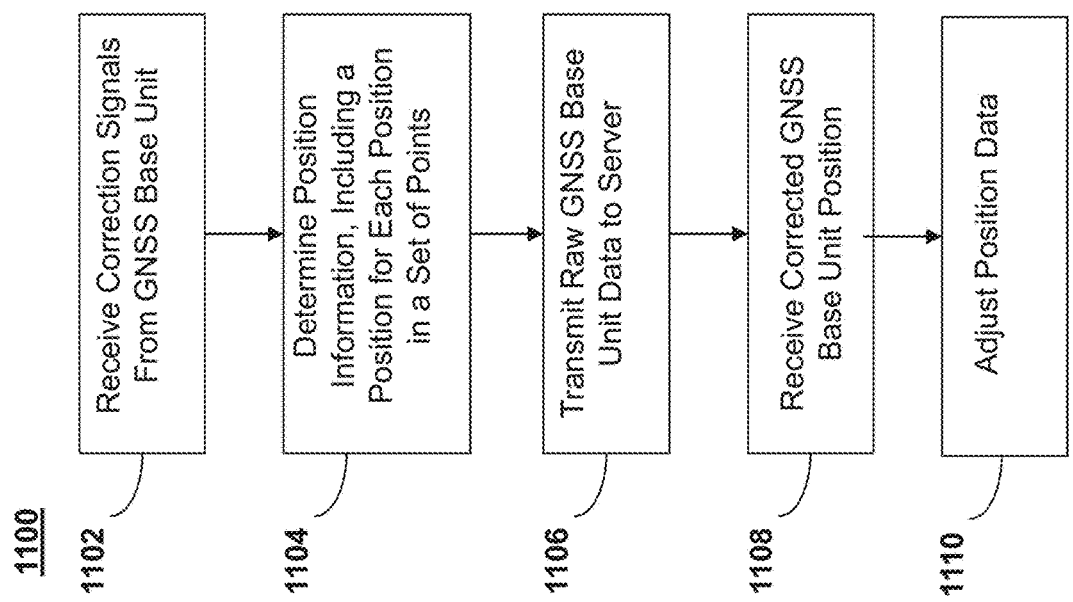
FIG. 11 illustrates an exemplary process for adjusting position data for a set of position.

FIG. 11 illustrates an exemplary process 1100 for using a VB RTK system. Process 1100 relies on a GNSS base unit (see incorporated references for details about the base unit) and GNSS rover unit (e.g., graphics-aided geodesic device 100). In some exemplary setups, the GNSS base unit may be a mile or less from the GNSS rover unit to ensure higher position accuracy.

At block 1102 a GNSS base unit transmits a correction signal to a GNSS rover unit. Prior to using the GNSS rover unit to determine a position for a point of the set of points, the user may setup the GNSS base unit at a known point having a known position. The GNSS base unit transmits correction signals to the GNSS rover unit that improves accuracy of the GNSS rover unit's determination of a position of a point. The GNSS base unit may transmit the correction signal wirelessly on a frequency adapted to travel on the order of at least a miles. For example, the GNSS base unit may use a UHF wireless interface to transmit the correction signal. The GNSS base unit may store raw GNSS data that is used to determine the position of the GNSS base unit.

At block 1104 a GNSS rover unit determines position data for a set of points (e.g., a position for each point in the set of points). The set of points may be pre-defined or the points may be selected as a user moves the GNSS unit around a working area. After receiving the correction signal, the GNSS rover unit may use the correction signal and GNSS satellite signals to determine the position of the point where the GNSS rover unit is located. This process may be repeated for each of the points in the set of points.

At block 1106 the raw GNSS data from the GNSS base unit used to determine the point where the GNSS base unit is located may be transmitted to a server system that processes the data to determine a correction to the position. This transmission may be carried out any number of ways. For example, the GNSS base unit may transmit the data directly to the server system using wireless network connections, such as GSM, CDMA, LTE, or WiFi connections. As another example, the GNSS base unit may transfer the data to the GNSS rover unit using Bluetooth, WiFi, SD Cards, USB, or some other form of communication. The GNSS rover may then transmit the raw GNSS data to the server system over a network connection, such as a GSM, CDMA, LTE, or WiFi connection to the Internet.

At block 1108 the server system returns corrected position data for the position of the GNSS base unit. For example, the server system may process the raw GNSS data with National Geodetic Survey (NGS) Continuously Operating Reference Stations (CORS) data to generate corrected position data. The corrected position data may be, for example, a corrected position of the GNSS base unit or an offset to apply to a previously determined position of the GNSS base unit. The GNSS rover unit receives the corrected position data over, for example, a wireless interface connected to the Internet.

At block 1110 the GNSS rover unit uses the corrected position data to translate the position data to create translated position data for the set of points. For example, if the corrected position data is an offset for the position of the point where the GNSS base unit is located, that offset may be applied to the determined position of each point in the set of points. As another example, if the corrected position data is a correct position for the point where the GNSS base unit is located, an offset can be calculated and applied to the determined position of each point in the set of points. Before the position data for the set of points is translated using the corrected position data, optionally, the user may be prompted ensure that the position data should be translated.

Correcting the position data of the set of points can be an automated process. For example, blocks 1102, 1106, 1108, and 1110 may be automated to require no or limited user interaction in order to make process 1100 as seamless as possible for the user. The corrected position data can also be used to verify a user entered position of the GNSS base unit.

As an alternative to translating the position data with the corrected position data after the position data has already been collected, translating may not be needed if the position data is accounts for the corrected position data in real-time as the position data is being collected. For example, the GNSS base unit may receive corrected position data on a regular basis from a server system that provides corrected position data that accounts for errors introduced by atmospheric conductions. The GNSS base unit then uses the corrected position data to provide a correction signal to the GNSS rover that accounts for the corrected position data. As the GNSS rover determines position data for the set of points, the position data already accounts for the corrected position data, and thus no later translation is needed. As compared to process 1100, this alternative has the benefit of providing the translated position data in real-time, instead of having to perform the translation process described at a later time. However, this alternative also requires the GNSS base unit to have data access to the server system, which can be difficult in areas with poor coverage by communications networks. Access to the communications networks may also be prohibitively expensive.

As an alternative to using a GNSS base unit to provide the correction signal above, a correction network can be used instead. In this alternative, a network of reference stations with ranges usually less than 100 km is used. The network stations continuously collect satellite observations and send them to a central processing facility, at which the station observations are processed in a common network adjustment and observation errors and their corrections are computed. The observation corrections obtained from the network are sent to the GNSS rover, operating within the coverage area of the network, to mitigate position errors. This process requires the GNSS rover to transmit its location to the central processing facility so that the central processing facility can determine the appropriate correction signal to send back to the GNSS rover. These two communication channels (i.e., from the rover to the central processing facility and from the central processing facility back to the rover) may beneficially occur using different communication interfaces.

For example, in a GNSS device, such as graphics-aided geodesic device 100 described in FIGS. 1-5, that has multiple communication interfaces, the interface the GNSS rover uses to transmit its position to the central processing facility may be different than the interface the GNSS rover uses to receive the correction signal from the central processing facility. The two interfaces can be chosen based on characteristics of the communications using the interface, such as cost, service area, bandwidth, and latency. The characteristics of the transmission to the central processing facility and the transmission of the correction signal to the GNSS rover may also be considered, such as size of the transmission and how often the transmissions are made.

In one example, the GNSS rover transmits its position to the central processing facility using a terrestrial-based communication network that connects to the Internet, such as a GPRS network using cellular towers. Similar terrestrial-based communication networks could also be used, such as 3G, 4G, or LTE networks. However, GPRS networks have the advantage of typically having better coverage area. The correction signal may then be transmitted back to the GNSS rover using one-way satellite communication via a satellite communication network. This arrangement eliminates the need for two-way satellite communications, which can simplify the hardware requirements for the GNSS rover, reduce network service costs, and conserve power. In other words, the GNSS rover in this example would only need an interface that can receive satellite communications signals and would not need to be able to transmit them. This example still provides robust correction signals while minimizing network costs because the communications from the GNSS rover to the central processing facility are rare (e.g., in some cases, occurring every tens of minutes or no more than once every ten minutes). This means that GPRS data costs are low because the more frequently occurring correction signals (e.g., every few seconds or less or once a second) occur over one-way satellite communications. Accordingly, in this example, by using two different communication interfaces on the GNSS rover, the cost of the communications can be reduced and the GNSS rover communications hardware can be simplified.

If correction signals are sent more often than every second, (e.g., at 5 Hz) an unexpected increase in productive occurs. Conventional RTK corrections are not sent any faster than 1 Hz because of the general belief that GNSS satellites must move before an additional correction signal is useful. However, when the corrections are sent at frequencies of 5 Hz, for example, an RTK solution is obtained faster (e.g., by resolving ambiguities faster), which has the unexpected benefit of improved productivity. This applies whether the correction signals are sent from a central processing facility of a correction network or from a GNSS base station. The more frequent RTK corrections may reduce the time to obtain a position of a point. For example, for a correction signal sent once a second, it may take 30 seconds to find a solution in some environments. In contrast, using a correction signal sent five times a second may reduce the time needed for a solution to a few seconds. The increased frequency of the correction signal may be particularly helpful in environments without clear views of the sky, such as under trees or in an area with large buildings that create multipath issues.

View and Document Level

A level, such as a circular bubble level, may be used to verify that a GNSS device is not tilted. The level may be mounted on the GNSS device or mounted in some other way that structurally couples to the GNSS device and indicates whether the GNSS device is tilted in the two-dimensional plane parallel to the ground. For example, the level may be mounted on a support structure, such as a pole, tripod, or trolley, to which the GNSS device is also mounted. In this example, it may be inconvenient for a user to look both at a display to operate the GNSS device and the level to ensure that the GNSS device is not tilted. The display is typically viewable from the side of the GNSS device and the level is typically below the GNSS device on the support structure. This configuration requires the user to focus in two different directions to properly setup and operate the GNSS device. Using an exemplary process described below, a bottom facing image sensor on the GNSS device will automatically focus on the level and capture an image or series of images (i.e., a video stream). The image or images of the level can then be displayed on the display so that the user can operate the GNSS device while continuing to monitor the level for tilt of the GNSS device. This configuration also enables a user to take screen shots to document the level of the GNSS device and to calibrate an electronic level of the GNSS device against the bubble level.

Figure 12:
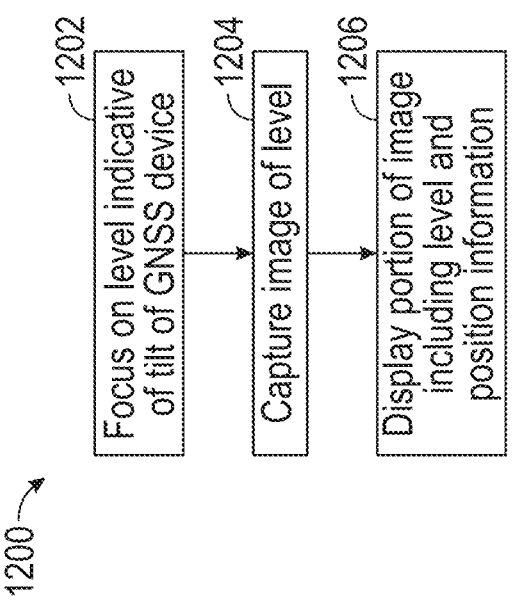
FIG. 12 illustrates an exemplary process for using an image of a level with a GNSS device.
Figure 15:
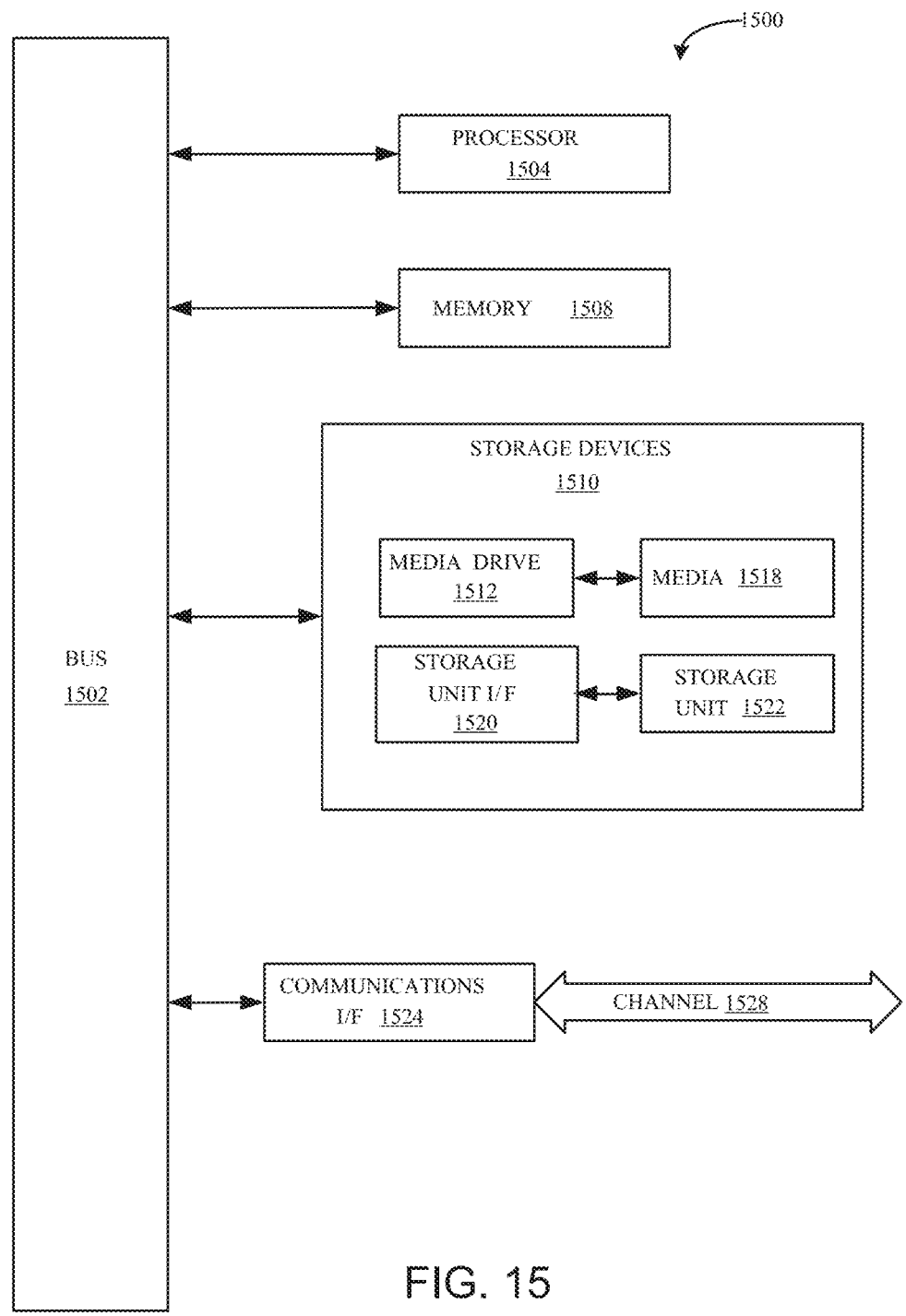
FIG. 15 depicts an exemplary computer system that may be used to implement embodiments of the present invention.

FIG. 12 illustrates an exemplary process 1200 for using a level with a GNSS device. Process 1200 relies on a GNSS device (e.g., graphics-aided geodesic device 100) that has an image sensor that can focus on a level that is structurally mounted with the GNSS device so that the level indicates whether the GNSS device is tilted in the two-dimensional plane parallel to the ground.

At block 1202 the GNSS device focuses an image sensor on a location with a level that indicates a tilt of the GNSS device with respect to the two-dimensional plane parallel to the ground. The level may be structurally mounted with the GNSS device to a support. For example, in FIG. 13, GNSS device 1302 and bubble level 1304 are mounted to support pole 1306. The GNSS device may focus the image sensor on the level by capturing an image of a scene that includes the level and then image process the captured image to identify the location of the level. The GNSS device can then focus the image sensor on the location of the level. As an alternative, a user can identify the location of the level in an image or the user can manually focus the image sensor until the level is in focus.

Referring back to FIG. 12, at block 1204 the GNSS device captures an image of a scene that includes the level. For example, with reference to FIG. 13, an image sensor on the bottom of GNSS device 1302 may capture an image of the top-down view of level 1304. Because of the focusing done in block 1202, the level should be in focus in the image. It is also possible that instead of a single image, a series of images are captured to form a live stream or live video of the scene containing the level.

Figure 14:
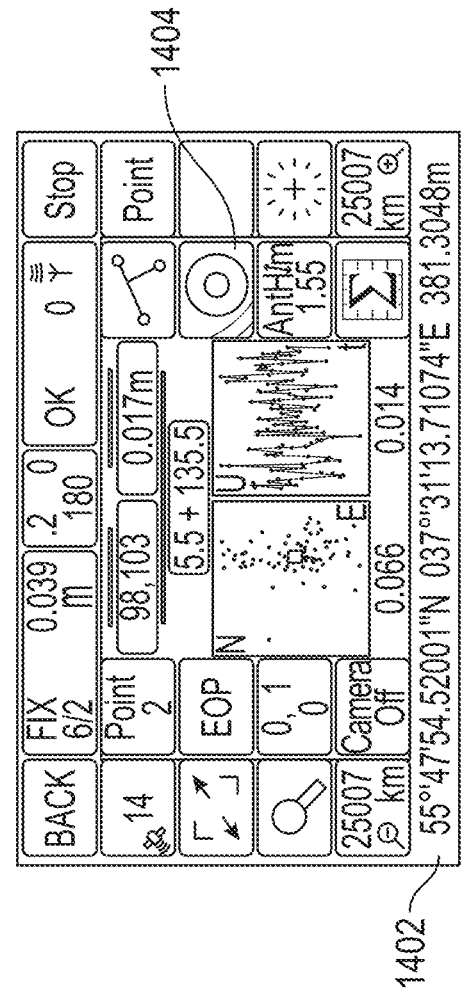
FIG. 14 depicts a screen shot of a GNSS device that includes a portion of an image of a level.
Figure 13:
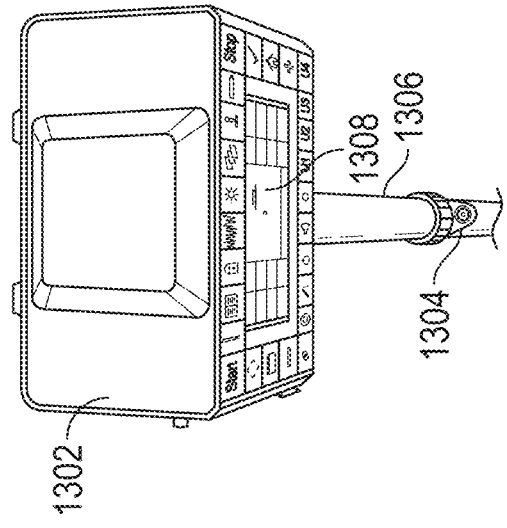
FIG. 13 depicts a GNSS unit mounted on a pole with a level.

Referring to FIG. 12 again, at block 1206 the GNSS device displays a portion of the image of the level on a display of the GNSS device, such as display 1308 of FIG. 13. For example, FIG. 14 depicts example screen shot 1400 of a display of a GNSS device. Position information 1402 is also displayed on the bottom of screen shot 1400. Other position data is displayed around screen shot 1400. Portion 1404 of the image is displayed. Portion 1404 depicts the level as captured by the image sensor. Portion 1406 may be static or dynamic and the result of cropping the image.

Screen shot 1400 may be stored in memory of the GNSS device to document the measurement and setup of the GNSS device. Portion 1404 may also be used to calibrate an electronic level that is internal to the GNSS device.

Visual Angle Measurement

In addition the features discussed above, a GNSS device equipped with a camera may also be useful for determining an angle between two points with respect to the point where the GNSS device is located. The image sensor may capture an image of a scene that includes the two points. The image may be displayed on the display of the GNSS device. The user may indicate a first point and second point in the image. The GNSS device may then calculate an angle between the two points based on the field of view of the image sensor and the locations of the two points in the image. The calculated angle may then be displayed on the GNSS display or the image may be tagged, in the metadata for example, with the calculated angle before storing the image in memory of the GNSS device.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method for using a GNSS device to determine a position of an unknown point, the method comprising:
   determining a first position of a first point based on GNSS signals received by the GNSS device, wherein the first point is at a first location;
   capturing a first image from the first point at the first location using an image sensor of the GNSS device, the first image including the unknown point and at least one of a second point or a third point;
   determining a second position of the second point based on GNSS signals received by the GNSS device, wherein the second point is at a second location;
   capturing a second image from the second point at the second location, the second image including the unknown point and at least one of the first point or the third point;
   determining a third position of the third point based on GNSS signals received by the GNSS device, wherein the third point is at a third location;
   capturing a third image from the third point at the third location, the third image including the unknown point and at least one of the second point or the first point; and
   calculating a position of the unknown point based on the first, second, and third images and the first, second, and third positions, wherein the first point, the second point, the third point, and the unknown point are different points.

2. The method of claim 1, wherein at least one of the first image, the second image, or the third image include a marker on at least one of the first point, the second point, or the third point.

3. The method of claim 2, wherein the second position is determined using the GNSS device.

4. The method of claim 3, wherein the third position is determined using the GNSS device.

5. The method of claim 1, wherein the GNSS device calculates the position of the unknown point.

6. The method of claim 5, wherein the calculation of the position of the unknown point is based on a photogrammetric algorithm.

7. The method of claim 1, wherein an image sensor of the GNSS device captures of at least one of the first image, the second image, or the third image.

8. The method of claim 1, wherein an image sensor of the GNSS device captures each of the first image, the second image, and the third image.

9. The method of claim 1, wherein an image sensor separate from the GNSS device captures at least one of the first image, the second image, or the third image.

10. The method of claim 1, wherein at least one of the first image, the second image or the third image includes metadata storing at least one of the first position, the second position, or the third position.

11. A GNSS device comprising:
   an image sensor;
   a display configured to display images captured with the image sensor;
   a user interface configured to receive user input;
   a processor configured to execute instructions; and
   memory containing a instructions executable on the processor, the instructions include instructions for:
      determining a first position of a first point based on GNSS signals received by the GNSS device, wherein the first point is at a first location;
      capturing a first image from the first point at the first location using the image sensor, the first image including the unknown point and at least one of a second point or a third point, wherein;
      determining a second position of the second point based on GNSS signals received by the GNSS device, wherein the second point is at a second location;
      capturing a second image from the second point at the second location, the second image including the unknown point and at least one of the first point or the third point;
      determining a third position of the third point based on GNSS signals received by the GNSS device, wherein the third point is at a third location;
      capturing a third image from the third point at the third location, the third image including the unknown point and at least one of the second point or the first point; and
      calculating a position of the unknown point based on the first, second, and third images and the first, second, and third positions, wherein the first point, the second point, the third point, and the unknown point are different points.

12. A non-transitory computer-readable storage medium storing computer executable instructions for:
   determining a first position of a first point based on GNSS signals received by the GNSS device, wherein the first point is at a first location;
   capturing a first image from the first point at the first location using an image sensor, the first image including the unknown point and at least one of a second point or a third point;
   determining a second position of the second point based on GNSS signals received by the GNSS device, wherein the second point is at a second location;
   capturing a second image from the second point at the second location, the second image including the unknown point and at least one of the first point or the third point;
   determining a third position of the third point based on GNSS signals received by the GNSS device, wherein the third point is at a third location;

capturing a third image from the third point at the third location, the third image including the unknown point and at least one of the second point or the first point; and calculating a position of the unknown point based on the first, second, and third images and the first, second, and third positions, wherein the first point, the second point, the third point, and the unknown point are different points.

13. The non-transitory computer-readable storage medium of claim 12, wherein at least one of the first image, the second image, or the third image include a marker on at least one of the first point, the second point, or the third point.

14. The non-transitory computer-readable storage medium of claim 13, wherein the second position is determined using the GNSS device.

15. The non-transitory computer-readable storage medium of claim 14, wherein the third position is determined using the GNSS device.

16. The non-transitory computer-readable storage medium of claim 12, wherein the GNSS device calculates the position of the unknown point.

17. The non-transitory computer-readable storage medium of claim 16, wherein the calculation of the position of the unknown point is based on a photogrammetric algorithm.

18. The non-transitory computer-readable storage medium of claim 17, wherein at least one of the first image, the second image or the third image includes metadata storing at least one of the first position, the second position, or the third position.

19. The non-transitory computer-readable storage medium of claim 12, wherein at least one of the first image, the second image or the third image includes metadata storing at least one of the first position, the second position, or the third position.

* * * * *